United States Patent
Iguchi et al.

(10) Patent No.: US 12,174,072 B2
(45) Date of Patent: *Dec. 24, 2024

(54) SPECTROMETRIC DEVICE AND SPECTROMETRIC METHOD

(71) Applicant: HAMAMATSU PHOTONICS K.K., Hamamatsu (JP)

(72) Inventors: Kazuya Iguchi, Hamamatsu (JP); Hideki Masuoka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,632

(22) Filed: Nov. 10, 2023

(65) Prior Publication Data
US 2024/0077360 A1 Mar. 7, 2024

Related U.S. Application Data

(63) Continuation of application No. 17/423,948, filed as application No. PCT/JP2019/050199 on Dec. 20, 2019, now Pat. No. 11,892,352.

(30) Foreign Application Priority Data

Jan. 21, 2019 (JP) ................................ 2019-007632

(51) Int. Cl.
*G01J 3/32* (2006.01)
(52) U.S. Cl.
CPC ..................... *G01J 3/32* (2013.01)
(58) Field of Classification Search
CPC .... G01J 3/32; G01J 2003/2813; G01J 3/2803; G01J 3/36; G01J 3/2823; G01J 3/40; G01J 2003/283
See application file for complete search history.

(56) References Cited

U.S. PATENT DOCUMENTS 5,185,771 A   2/1993 Anger et al.
11,828,653 B2 * 11/2023 Iguchi .................. G01J 3/2803
(Continued)

FOREIGN PATENT DOCUMENTS

CN   1817027 A   8/2006
CN   102187203 A   9/2011
(Continued)

OTHER PUBLICATIONS

Hamamatsu Photonics K.K., "Technical information: Resistive gate type CCD linear image sensor with electronic shutter function", Hamamatsu Photonics K.K., 2016, p. 1-p. 35.
(Continued)

*Primary Examiner* — Tarifur R Chowdhury
*Assistant Examiner* — Akbar H. Rizvi
(74) *Attorney, Agent, or Firm* — Faegre Drinker Biddle & Reath LLP

(57) ABSTRACT

A spectroscopic measurement apparatus includes an optical system, a photodetector, and an analysis unit. The optical system guides measurement target light from an object to a light receiving surface of the photodetector, and forms a spectral image of the measurement target light on the light receiving. The photodetector includes the light receiving surface on which a plurality of pixels are arranged respectively on a plurality of rows. The photodetector receives the spectral image for a first exposure time by a plurality of pixels in a first region on the light receiving surface, and outputs first spectrum data. The photodetector receives the spectral image for a second exposure time by a plurality of pixels in a second region on the light receiving surface, and outputs second spectrum data. The second exposure time is longer than the first exposure time.

14 Claims, 11 Drawing Sheets

(56) References Cited

U.S. PATENT DOCUMENTS

| | | |
|---|---|---|
| 2002/0024664 A1 | 2/2002 | Yokota et al. |
| 2004/0085535 A1 | 5/2004 | Hammer et al. |
| 2005/0001914 A1 | 1/2005 | Keny |
| 2007/0057159 A1* | 3/2007 | Hing .................. G01J 3/2803 250/214 R |
| 2007/0165222 A1* | 7/2007 | Bouzid ............... G01J 3/2803 356/328 |
| 2008/0067328 A1* | 3/2008 | Fujita .................. G01J 3/10 250/208.6 |
| 2010/0245620 A1 | 9/2010 | Arai et al. |
| 2015/0015747 A1 | 1/2015 | Hizi |
| 2015/0108333 A1 | 4/2015 | Bouckaert |
| 2017/0067782 A1 | 3/2017 | Wang et al. |
| 2018/0156860 A1 | 6/2018 | Nakamura et al. |
| 2018/0286650 A1 | 10/2018 | Bullock et al. |

FOREIGN PATENT DOCUMENTS

| | | |
|---|---|---|
| CN | 107003183 A | 8/2017 |
| CN | 107003243 A | 8/2017 |
| CN | 107005663 A | 8/2017 |
| CN | 107615603 A | 1/2018 |
| CN | 108458786 A | 8/2018 |
| EP | 0809303 A1 | 11/1997 |
| JP | 2001-024955 A | 1/2001 |
| JP | 2001-061765 A | 3/2001 |
| JP | 2007-527516 A | 9/2007 |
| KR | 10-2006-0030888 A | 4/2006 |
| KR | 10-2015-0007210 A | 1/2015 |
| KR | 10-2017-0092520 A | 8/2017 |
| WO | WO 01/061292 A1 | 8/2001 |
| WO | WO 2005/012954 A2 | 2/2005 |
| WO | WO 2006/054292 A2 | 5/2006 |
| WO | WO-2015/046045 A1 | 4/2015 |
| WO | WO 2016/088568 A1 | 6/2016 |

OTHER PUBLICATIONS

International Preliminary Report on Patentability mailed Jul. 29, 2021 for PCT/JP2019/050199.

* cited by examiner

SPECTROMETRIC DEVICE AND SPECTROMETRIC METHOD

TECHNICAL FIELD

The present disclosure relates to a spectroscopic measurement apparatus and a spectroscopic measurement method.

BACKGROUND ART

A spectroscopic measurement apparatus receives a spectral image of measurement target light generated in an object using a photodetector to acquire a spectrum of the measurement target light, and can analyze a composition of the object based on the spectrum, and can monitor phenomenon in the object. In the spectroscopic measurement apparatus, in some cases, it is required to acquire a spectrum of a high dynamic range (see Patent Document 1).

For example, in a step of dry etching of an object by plasma processing, light due to a gas used for the etching is generated, and further, light due to a material of the etching object is also generated. A wavelength band of the light due to the gas may be different from a wavelength band of the light due to the material. Monitoring an intensity of the light due to the gas enables monitoring a state of the gas. Monitoring a temporal change in intensity of the light due to the material enables detection of etching end timing. The light due to the gas is of high intensity, whereas the light due to the material is often of low intensity.

With the development of miniaturization in semiconductor processes in recent years, openings formed by dry etching become small, and the intensity of the light generated due to the material (light for detection of etching end timing) is becoming weaker. In the step of dry etching of the object by plasma processing, it is important to monitor the state of the gas, and it is also important to detect the etching end timing. Therefore, it is necessary to acquire the spectrum of the measurement target light including both of the light of high intensity due to the gas and the light of low intensity due to the material using the spectroscopic measurement apparatus. In this case, a dynamic range of the spectrum of the measurement target light (ratio of maximum level and minimum level of light intensity of each wavelength) is large.

Further, in measuring a photoluminescence quantum yield of a sample using an integrating sphere, a spectrum of excitation light is measured in a state in which no sample is put in the integrating sphere, and further, a spectrum of the excitation light absorbed by the sample and a spectrum of light generated in the sample (for example, fluorescence) are measured at the same time in a state in which the sample is put in the integrating sphere. In order to accurately estimate the excitation light absorbed by the sample, in general, it is necessary to measure the spectrum of the excitation light and the spectrum of the generated light in a same exposure period.

At this time, since the excitation light intensity is extremely high compared with the generated light intensity, an exposure time has to be short for measuring the high excitation light intensity regardless of the necessity of measuring the low generated light intensity. Therefore, it is not possible to measure the generated light with a good S/N ratio. In a sample with low emission efficiency, although it is desired to increase the excitation light intensity, the photodetector is saturated with the excitation light having an intensity of a certain light amount or more, and thus, increasing the excitation light intensity is not easy.

Not limited to these examples, the dynamic range of the spectrum of the measurement target light may be large, and it may be desired to acquire the spectrum of the measurement target light at the same time.

CITATION LIST

Patent Literature

Patent Document 1: Japanese Patent Application Laid-Open Publication No. 2007-527516

SUMMARY OF INVENTION

Technical Problem

The dynamic range of the photodetector (the ratio of the maximum level and the minimum level of the light intensity detectable by the photodetector) has limitations. When the dynamic range of the spectrum of the measurement target light is larger than the dynamic range of the photodetector, the spectrum of the measurement target light fails to be acquired by receiving a spectral image by the photodetector at one time. That is, when a signal level output for light in a low-intensity wavelength band is set to a noise level or more, a signal level output for light in a high-intensity wavelength band is a saturation level or more. On the other hand, when the signal level output for light in the high-intensity wavelength band is set to the saturation level or less, the signal level output for light in the low-intensity wavelength band is the noise level or less.

It is considered that, with the use of two photodetectors having different exposure times, a spectrum of light of high intensity is acquired by the photodetector with short time exposure and a spectrum of light of low intensity is acquired by the photodetector with long time exposure. However, in this case, a wavelength axis or a spectrum acquisition operation may be different between the two photodetectors due to device difference or temperature difference. Therefore, it is desirable to use a single photodetector to obtain the spectrum of the measurement target light including both of the light of high intensity and the light of low intensity.

An object of an embodiment is to provide a spectroscopic measurement apparatus and a spectroscopic measurement method that can acquire a spectrum of light with a high dynamic range using one photodetector.

Solution to Problem

An embodiment is a spectroscopic measurement apparatus. The spectroscopic measurement apparatus includes (1) an optical system for dispersing measurement target light to form a spectral image, (2) a photodetector including a light receiving surface on which a plurality of pixels are arranged respectively on a plurality of rows with the spectral image having a wavelength axis in a pixel arrangement direction of each of the plurality of rows being formed on the light receiving surface, and for receiving the spectral image for a first exposure time by a plurality of pixels arranged on one or a plurality of rows in a first region on the light receiving surface to output first spectrum data of the measurement target light, and receiving the spectral image for a second exposure time by a plurality of pixels arranged on one or a plurality of rows in a second region on the light receiving surface to output second spectrum data of the measurement target light, and (3) an analysis unit for obtaining a spectrum of the measurement target light based on the first spectrum data and the second spectrum data, and (4) the second exposure time is longer than the first exposure time, and when a wavelength band of the spectrum is divided into a saturation wavelength band including a wavelength band in which a value is at a saturation level or more in the second spectrum data and a non-saturation wavelength band other than the saturation wavelength band, the analysis unit obtains the spectrum of the measurement target light based on first partial spectrum data of the saturation wavelength band in the first spectrum data and second partial spectrum data of the non-saturation wavelength band in the second spectrum data.

An embodiment is a spectroscopic measurement method. The spectroscopic measurement method includes (1) a light detection step of using a photodetector including a light receiving surface on which a plurality of pixels are arranged respectively on a plurality of rows, forming a spectral image of measurement target light having a wavelength axis in a pixel arrangement direction of each of the plurality of rows on the light receiving surface, receiving the spectral image for a first exposure time by a plurality of pixels arranged on one or a plurality of rows in a first region on the light receiving surface to output first spectrum data of the measurement target light, and receiving the spectral image for a second exposure time by a plurality of pixels arranged on one or a plurality of rows in a second region on the light receiving surface to output second spectrum data of the measurement target light, and (2) an analysis step of obtaining a spectrum of the measurement target light based on the first spectrum data and the second spectrum data, and (3) in the light detection step, the second exposure time is longer than the first exposure time, and in the analysis step, when a wavelength band of the spectrum is divided into a saturation wavelength band including a wavelength band in which a value is at a saturation level or more in the second spectrum data and a non-saturation wavelength band other than the saturation wavelength band, the spectrum of the measurement target light is obtained based on first partial spectrum data of the saturation wavelength band in the first spectrum data and second partial spectrum data of the non-saturation wavelength band in the second spectrum data.

Advantageous Effects of Invention

According to the spectroscopic measurement apparatus and the spectroscopic measurement method of the embodiments, a spectrum of light of a high dynamic range can be acquired using one photodetector.

DESCRIPTION OF EMBODIMENTS

Hereinafter, embodiments of a spectroscopic measurement apparatus and a spectroscopic measurement method will be described in detail with reference to the accompanying drawings. In the description of the drawings, the same elements will be denoted by the same reference signs, without redundant description. The present invention is not limited to these examples.

Figure 1:
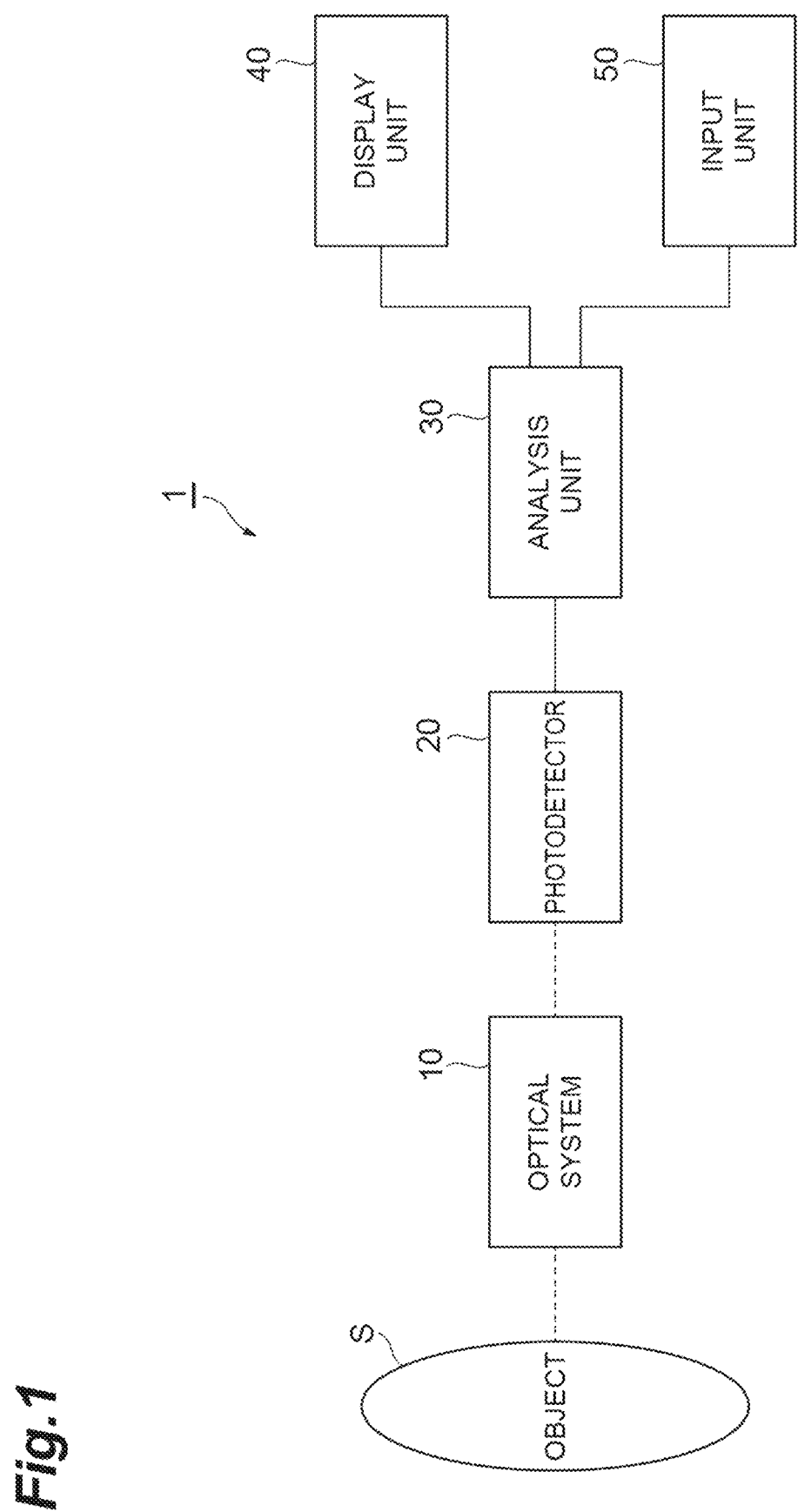
FIG. 1 is a diagram illustrating a configuration of a spectroscopic measurement apparatus.

FIG. 1 is a diagram illustrating a configuration of a spectroscopic measurement apparatus 1. The spectroscopic measurement apparatus 1 includes an optical system 10, a photodetector 20, an analysis unit 30, a display unit 40, and an input unit 50, and acquires a spectrum of measurement target light reached from an object S. For example, the object S is an object of dry etching by plasma processing, and the measurement target light from the object S includes light due to a gas used for the etching, and light due to a material of the etching object. Further, for example, the object S is an object put in an integrating sphere for measuring a photoluminescence quantum yield, and the measurement target light from the object S includes excitation light and generated light (for example, fluorescence).

The optical system 10 guides the measurement target light from the object S to the light receiving surface of the photodetector 20, and forms a spectral image of the measurement target light on the light receiving surface of the photodetector 20. The optical system 10 may include an optical fiber for guiding the light. The optical system 10 disperses the measurement target light into wavelength components using a spectroscopic element such as a grating or a prism, and forms the spectral image on the light receiving surface of the photodetector 20. The optical system 10 may include an optical element such as a lens and a mirror. Further, the optical system 10 may be a Czerny-Turner spectroscope, for example.

The photodetector 20 includes a light receiving surface on which a plurality of pixels are arranged respectively on a plurality of rows. On the light receiving surface, a spectral image having a wavelength axis in a pixel arrangement direction of each of the plurality of rows is formed. The photodetector 20 is a CCD image sensor or a CMOS image sensor formed on a semiconductor substrate, for example.

The photodetector 20 is preferably a photodetector that is thinned by grinding the rear surface (surface on the opposite side of the image sensor forming surface) of the semiconductor substrate and that can detect light with a high sensitivity in a wide wavelength band. Further, the CCD image sensor is preferable since it is of sensitivity higher than the CMOS image sensor. In addition, the CCD image sensor may be any of an interline CCD type, a frame transfer CCD type, and a full-frame transfer CCD type.

The light receiving surface of the photodetector 20 is divided into a first region and a second region. The photodetector 20 receives the spectral image for a first exposure time by a plurality of pixels arranged on one or a plurality of rows in the first region on the light receiving surface, and outputs first spectrum data of the measurement target light. Further, the photodetector 20 receives the spectral image for a second exposure time by a plurality of pixels arranged on one or a plurality of rows in the second region on the light receiving surface, and outputs second spectrum data of the measurement target light. The second exposure time is longer than the first exposure time.

The analysis unit 30 obtains the spectrum of the measurement target light based on the first spectrum data and the second spectrum data. The content of the analysis by the analysis unit 30 will be described later. The analysis unit 30 includes a storage unit storing input first spectrum data, second spectrum data, analysis results, and the like. Further, the analysis unit 30 may control the photodetector 20.

The analysis unit 30 may be a computer or a tablet terminal including a processor such as a central processing unit (CPU) and a storage medium such as a random access memory (RAM) and a read only memory (ROM), for example, and in this case, it can be integrated with the display unit 40 and the input unit 50. Further, the analysis unit 30 may be configured by a microcomputer or a field-programmable gate array (FPGA).

The display unit 40 displays the spectrum based on the first spectrum data and the second spectrum data input to the analysis unit 30, and further, displays the analysis result by the analysis unit 30. The input unit 50 is a keyboard, a mouse, and the like, for example, accepts an input instruction from an operator performing a spectroscopic measurement using the spectroscopic measurement apparatus 1, and gives the input information (for example, measurement conditions, display conditions, and the like) to the analysis unit 30. Further, the display unit 40 and the input unit 50 may be an integrated touch panel or the like.

Figure 2:
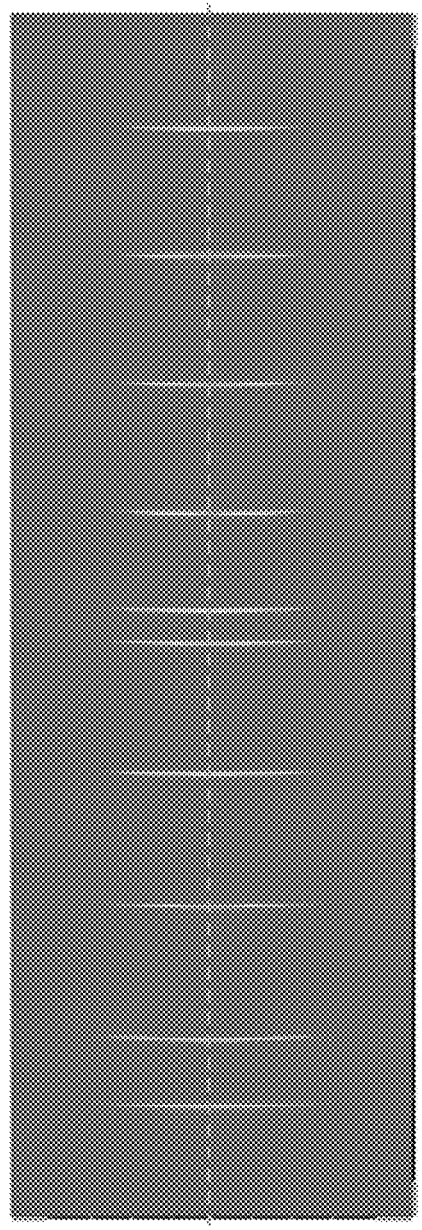
FIG. 2 is a diagram showing an example of a spectral image.

FIG. 2 is a diagram showing an example of the spectral image. In this drawing, a wavelength axis extends in the horizontal direction, and an image for each wavelength extends in the vertical direction. In general, the spectral image has a vertically symmetrical shape with a certain center line (a dashed line in the drawing) extending in the horizontal direction as the axis of symmetry. Further, depending on the characteristics of the optical system 10, the image for each wavelength has an arcuate shape in some cases.

Figure 3:
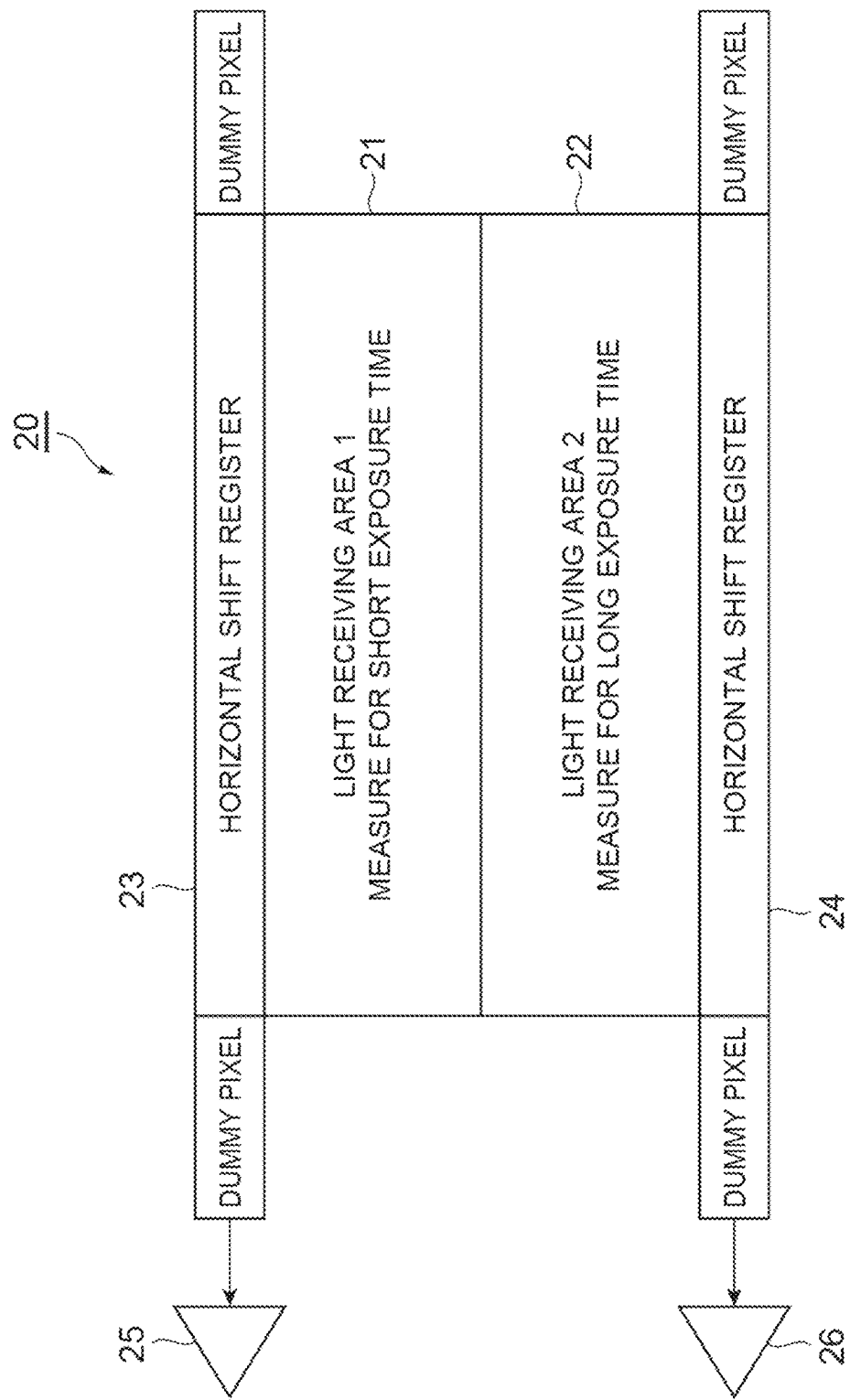
FIG. 3 is a diagram schematically illustrating a configuration of a photodetector.

FIG. 3 is a diagram schematically illustrating a configuration of the photodetector 20. In the following, the description is made as the photodetector 20 is a CCD image sensor. The light receiving surface of the photodetector 20 is divided into the first region 21 and the second region 22 with the symmetry axis (the dashed line in FIG. 2) of the spectral image to be formed as a boundary. In each of the first region 21 and the second region 22, a plurality of pixels are arranged on one or a plurality of rows. Each pixel can generate and accumulate charges of an amount according to an intensity of received light. For example, each of the first region 21 and the second region 22 has 128 rows in the vertical direction, and 2048 pixels are arranged in the horizontal direction in each row.

In the first region 21, the charges generated and accumulated in each pixel are transferred to a horizontal shift register 23, and the charges of one or more pixels in each column are added for each column in the horizontal shift register 23 (hereinafter, this operation is referred to as "vertical transfer"). After that, the charges added for each column in the horizontal shift register 23 are sequentially read from the horizontal shift register 23 (hereinafter, this operation is referred to as "horizontal transfer"). Then, a voltage value according to the amount of charges read from the horizontal shift register 23 is output from an amplifier 25, and the voltage value is AD-converted by an AD converter into a digital value. Accordingly, the first spectrum data is acquired.

In the second region 22, the charges generated and accumulated in each pixel are transferred to a horizontal shift register 24, and the charges of one or more pixels in each column are added for each column in the horizontal shift register 24 (vertical transfer). After that, the charges added for each column in the horizontal shift register 24 are sequentially read from the horizontal shift register 24 (horizontal transfer). Then, a voltage value according to the amount of charges read from the horizontal shift register 24 is output from an amplifier 26, and the voltage value is AD-converted by an AD converter into a digital value. Accordingly, the second spectrum data is acquired.

In the photodetector 20, the second exposure time in the second region 22 is longer than the first exposure time in the first region 21. The exposure time of each region can be set by an electronic shutter. The electronic shutter can be achieved by using an anti-blooming gate (ABG).

Preferably, the photodetector 20 synchronizes an output operation of the first spectrum data with an output operation of the second spectrum data. Further, preferably, the photodetector 20 has an output period of the second spectrum data at an integral multiple of an output period of the first spectrum data.

Figure 4:
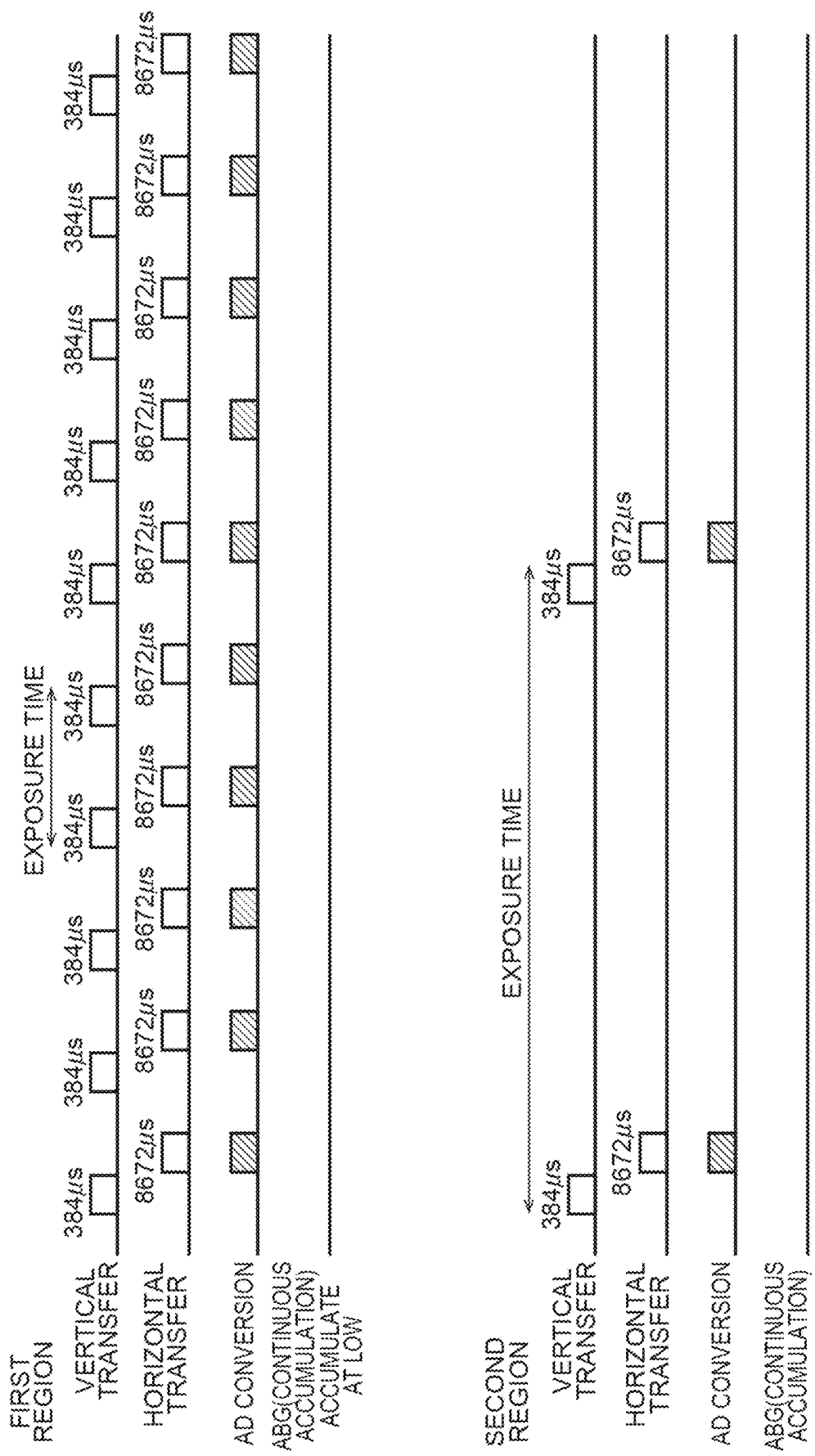
FIG. 4 is a timing chart illustrating a first operation example of the photodetector.

FIG. 4 is a timing chart illustrating a first operation example of the photodetector 20. This drawing is a timing chart in the case in which a full-frame transfer type CCD image sensor is used. In this case, half of the charges accumulated during the vertical transfer period are transferred to the horizontal shift register in the vertical transfer, and the remaining half are transferred to the horizontal shift register in the next vertical transfer.

In the first operation example, the ABG is always in the off state, and the charges are continuously accumulated in both the first region 21 and the second region 22. The output period of the second spectrum data from the second region 22 is five times the output period of the first spectrum data from the first region 21. Therefore, the second exposure time in the second region 22 is about five times the first exposure time in the first region 21. The analysis unit 30 may average a plurality (five, for example) of first spectrum data continuously output from the photodetector 20 and process the averaged first spectrum data.

Figure 5:
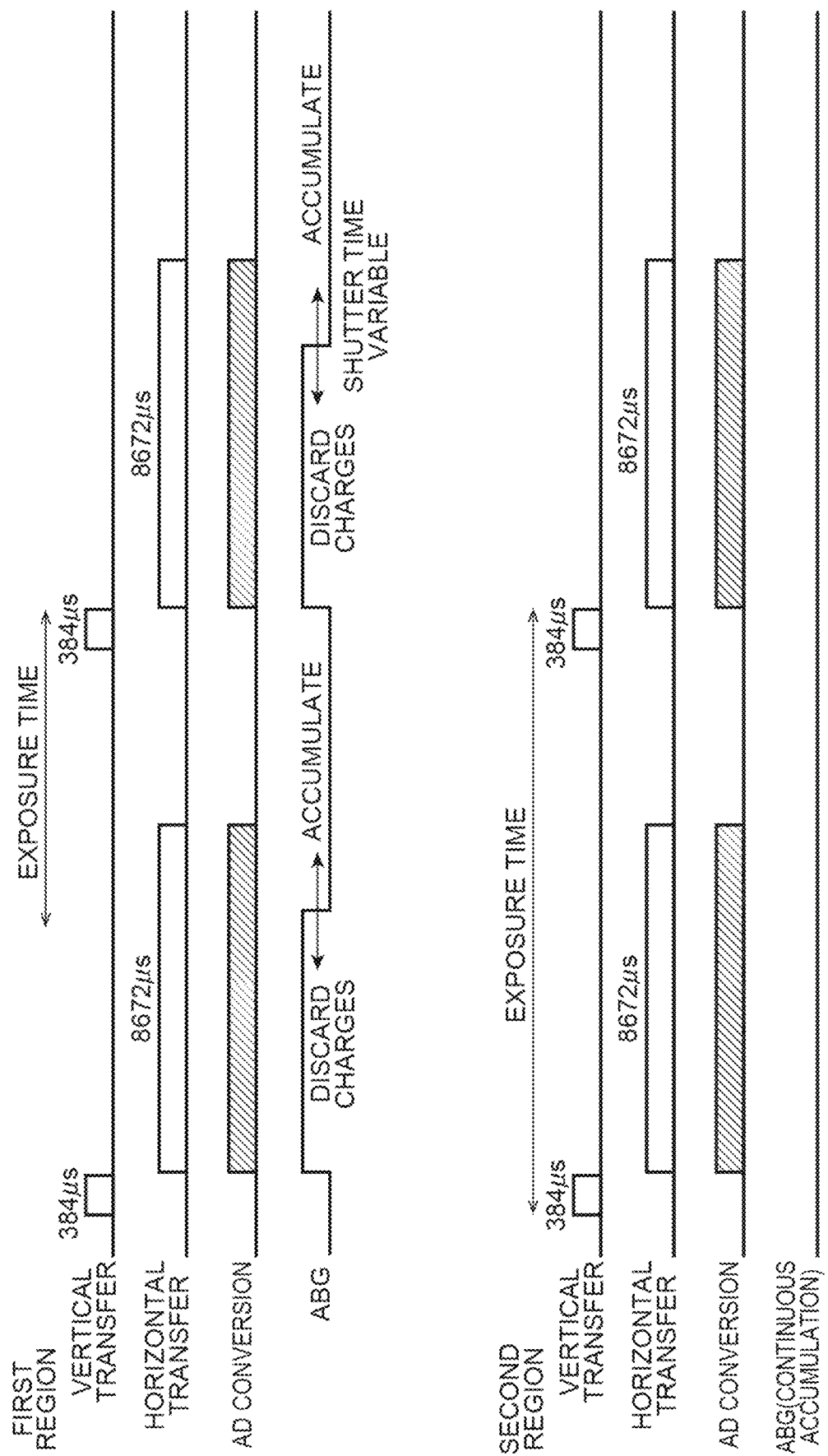
FIG. 5 is a timing chart illustrating a second operation example of the photodetector.

FIG. 5 is a timing chart illustrating a second operation example of the photodetector 20. This drawing is also a timing chart in the case in which a full-frame transfer type CCD image sensor is used.

In the second operation example, in the second region 22, the ABG is always in the off state, and the charges are continuously accumulated. Therefore, in the second region 22, the pulse phenomenon that occurs only for a moment can be measured. On the other hand, in the first region 21, the ABG periodically repeats on/off. Therefore, in the first region 21, the charges generated during the period when the ABG is in the on state are discarded, and the charges generated during the period when the ABG is in the off state are accumulated. In the first region 21, the unread charges in the vertical transfer are discarded before the next vertical transfer.

In both of the first operation example and the second operation example, when the output operations of the first region 21 and the second region 22 are not synchronized, the signal instructing one output operation may be superimposed as noise on the signal instructing the other output operation. Therefore, when the output operations of the first region 21 and the second region 22 are performed at the same timing, preferably, the output operations of the first region 21 and the second region 22 are completely synchronized.

Further, in both of the first operation example and the second operation example, when the charge accumulation is saturated in a certain pixel, pixels in the vicinity of the pixel may be adversely affected. Therefore, it is also preferable to discard the charges exceeding a certain amount using the ABG.

Figure 6:
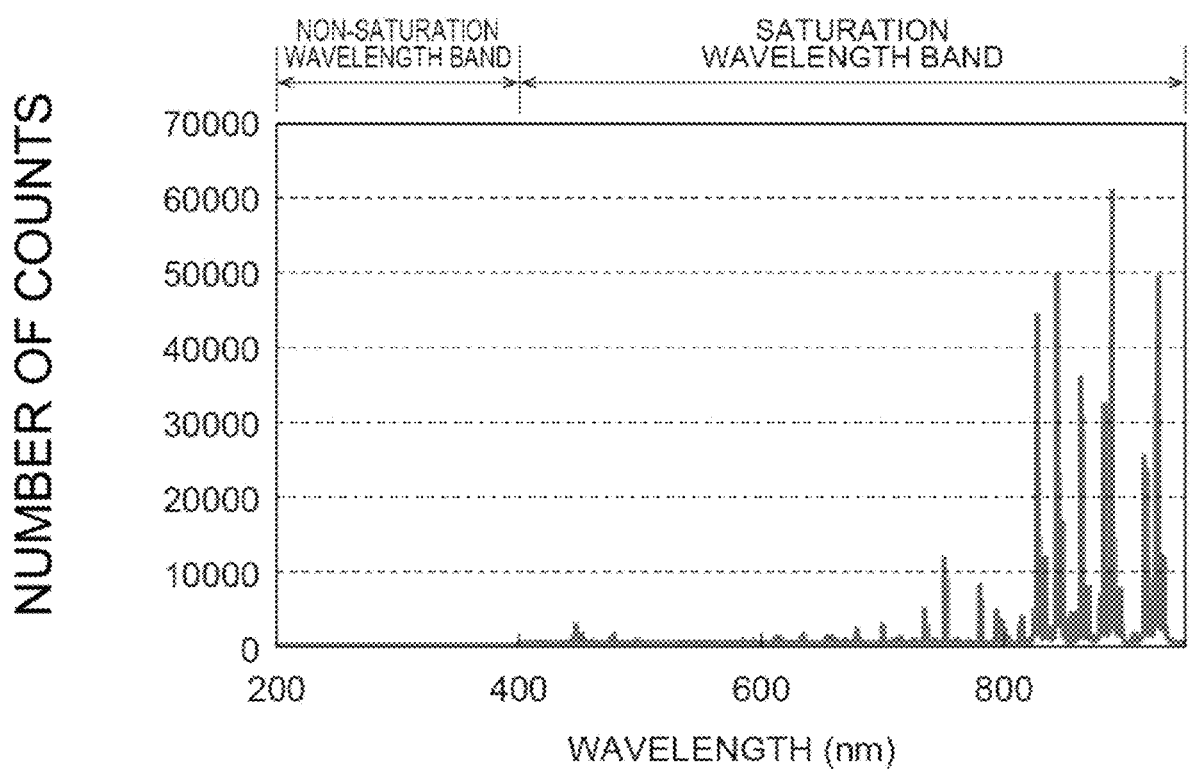
FIG. 6 is a diagram showing an example of first spectrum data.
Figure 7:
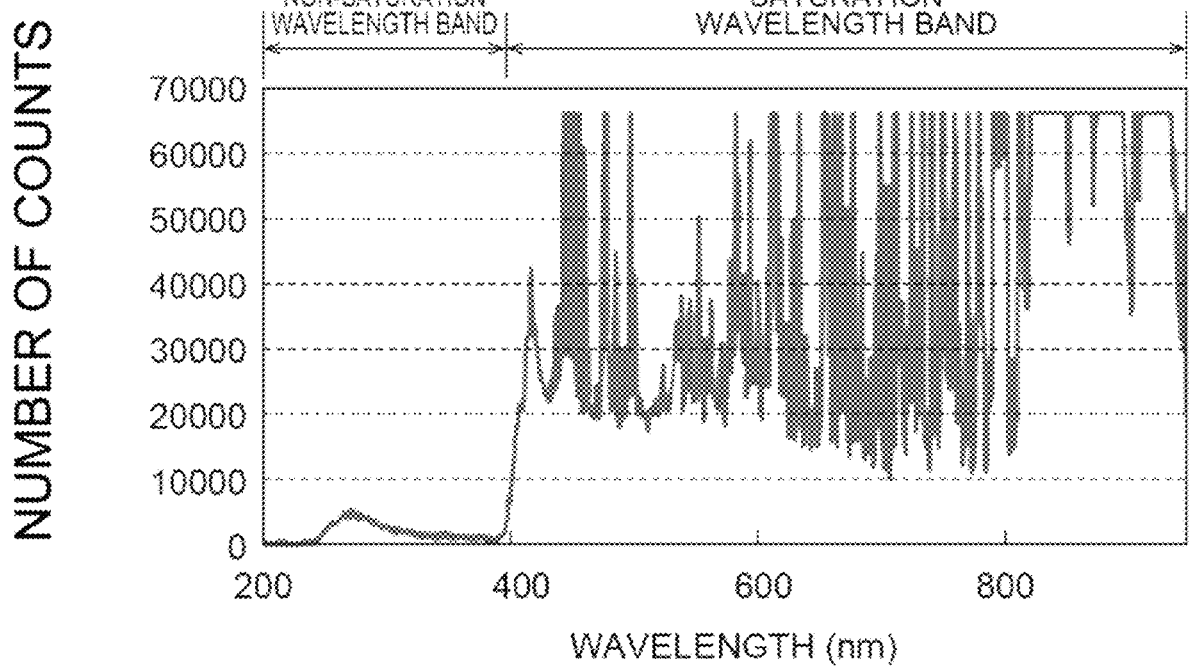
FIG. 7 is a diagram showing an example of second spectrum data.

FIG. 6 is a diagram showing an example of the first spectrum data. FIG. 7 is a diagram showing an example of the second spectrum data. The first spectrum data and the second spectrum data are acquired substantially at the same time by the photodetector 20. The first spectrum data (FIG. 6) is acquired in the first region 21 with a short exposure time, and is at the saturation level or less in all wavelength bands. On the other hand, the second spectrum data (FIG. 7) is acquired in the second region 22 with a long exposure time, and is at the saturation level or more in a certain wavelength band.

The analysis unit 30 divides the entire wavelength band of the spectrum (approximately 200 nm to 880 nm in these drawings) into a saturation wavelength band (approximately 400 nm to 880 nm) including a wavelength band in which a value is at the saturation level or more in the second spectrum data and a non-saturation wavelength band (approximately 200 nm to 400 nm) other than the saturation wavelength band. In the saturation wavelength band, the first spectrum data is less than the saturation level even though the second spectrum data is at the saturation level or more. In the non-saturation wavelength band, the second spectrum data is less than the saturation level, and can have a S/N ratio better than that in the first spectrum data.

The analysis unit 30 obtains the spectrum of the measurement target light based on the first partial spectrum data of the saturation wavelength band in the first spectrum data and the second partial spectrum data of the non-saturation wavelength band in the second spectrum data.

The analysis unit 30 combines the first partial spectrum data in the saturation wavelength band in the first spectrum data and the second partial spectrum data in the non-saturation wavelength band in the second spectrum data as described below, and thus, one spectrum of the measurement light can be obtained.

The analysis unit 30 obtains a ratio of the integrated values of the first spectrum data and the second spectrum data in a wavelength band in which both of the first spectrum data and the second spectrum data are at the saturation level or less. Specifically, the analysis unit 30 first sets the values of the first spectrum data and the second spectrum data to zero in a wavelength band in which both or one of the first spectrum data and the second spectrum data is the saturation level or more.

Figure 8:
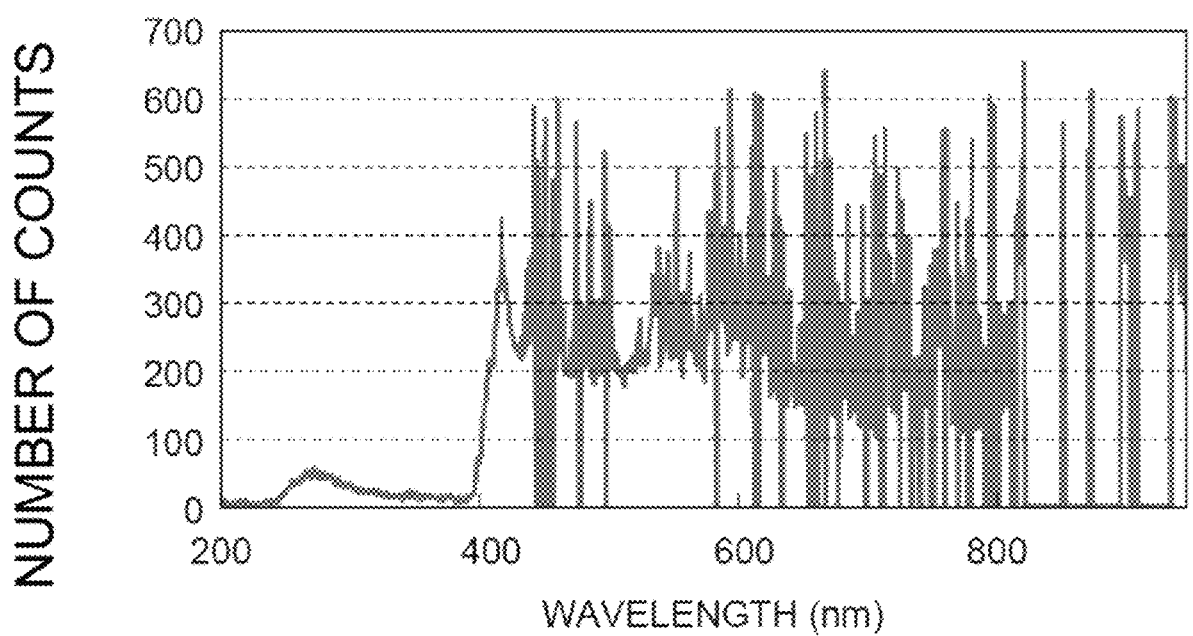
FIG. 8 is a diagram showing an example in which a value in a predetermined wavelength band is zero in the first spectrum data (FIG. 6).
Figure 9:
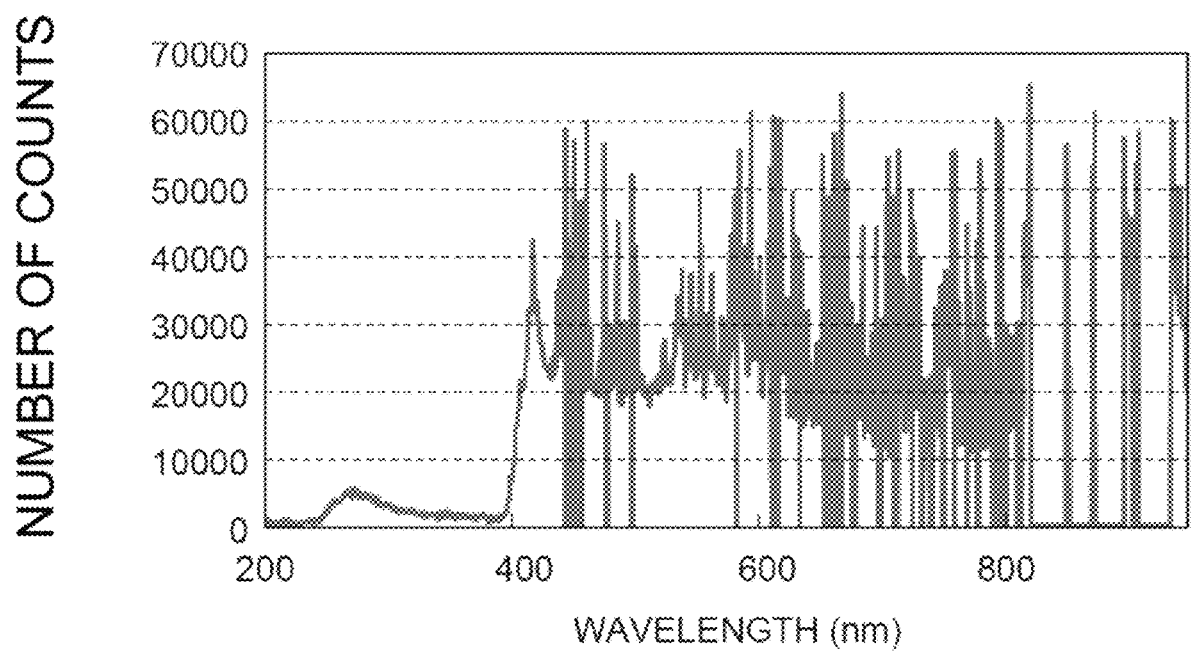
FIG. 9 is a diagram showing an example in which a value in a predetermined wavelength band is zero in the second spectrum data (FIG. 7).

FIG. 8 is a diagram showing an example in which the value in the predetermined wavelength band (wavelength band of the saturation level or more) is set to zero in the first spectrum data (FIG. 6). FIG. 9 is a diagram showing an example in which the value in the predetermined wavelength band (wavelength band of the saturation level or more) is set to zero in the second spectrum data (FIG. 7). The analysis unit 30 obtains the integrated values of the first spectrum data and the second spectrum data after setting the values in the predetermined wavelength band to zero, and obtains the ratio of these two integrated values. The ratio of the integrated values represents the intensity ratio of the output signals from the first region 21 and the second region 22, and represents the ratio of the exposure times.

Figure 10:
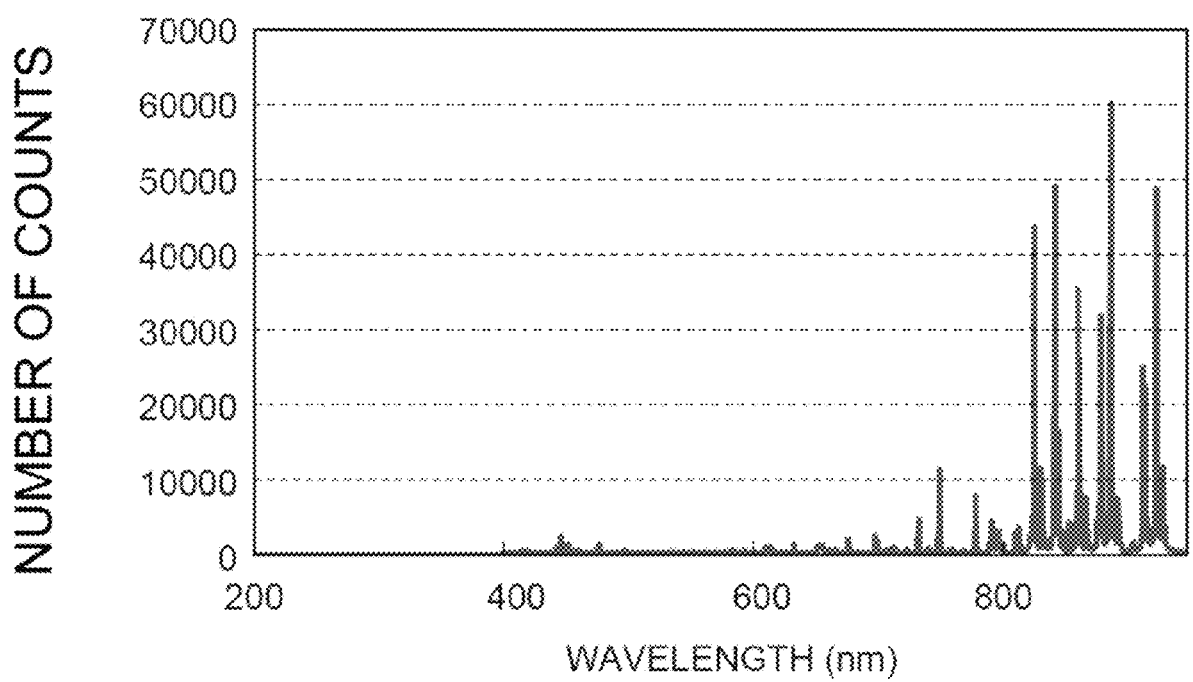
FIG. 10 is a diagram showing a spectrum of measurement target light obtained based on first partial spectrum data and second partial spectrum data after adjustment.

Further, the analysis unit 30 adjusts both or one of the first partial spectrum data and the second partial spectrum data using the ratio of the integrated values, and obtains the entire spectrum of the measurement target light based on the first partial spectrum data and the second partial spectrum data after the adjustment. In this adjustment, the first partial spectrum data may be multiplied by the integrated value ratio, or the second partial spectrum data may be divided by the integrated value ratio. For reducing the noise level, it is preferable to divide the second partial spectrum data by the integrated value ratio. FIG. 10 is a diagram showing the spectrum of the measurement target light obtained based on the first partial spectrum data and the second partial spectrum data after the adjustment.

The spectroscopic measurement method of the present embodiment performs measurement using the spectroscopic measurement apparatus of the present embodiment described above, and includes a light detection step of outputting the first spectrum data and the second spectrum data using the photodetector 20, and an analysis step of obtaining the spectrum of the measurement target light based on the first spectrum data and the second spectrum data. The content of the light detection step is as described as the configuration and operation of the photodetector 20. The content of the analysis step is as described as the analysis content of the analysis unit 30.

Figure 11:
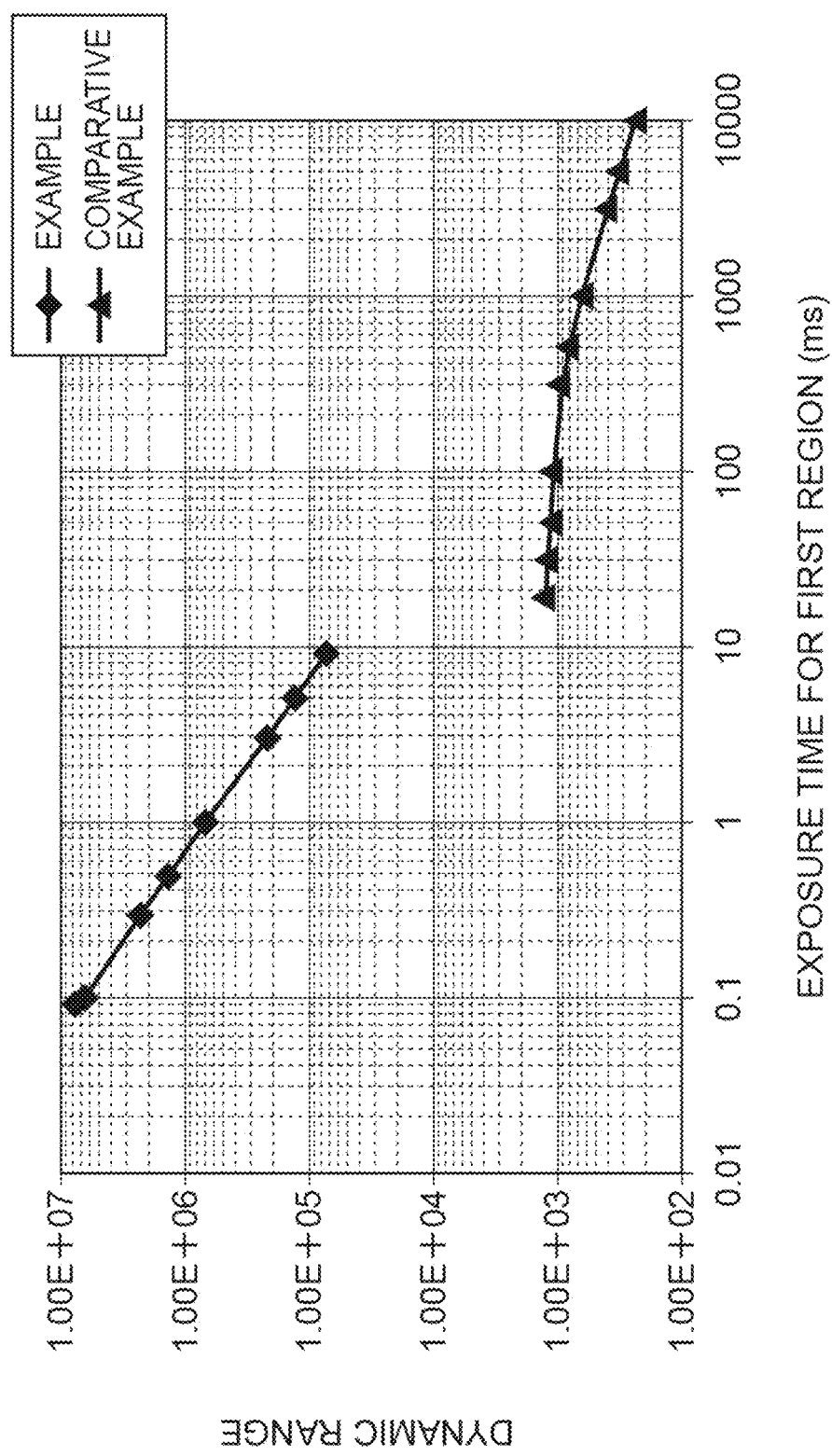
FIG. 11 is a graph showing an example of a relationship between an exposure time for a first region and a dynamic range in an example and a comparative example.

FIG. 11 is a graph showing an example of the relationship between the exposure time in the first region and the dynamic range in an example and a comparative example. The dynamic range of the comparative example is a dynamic range in the case in which the spectrum of the measurement target light is acquired without division into the first region and the second region. The dynamic range of the example is larger than that of the comparative example. The dynamic range is expressed as a ratio of a maximum detectable level and a minimum detectable level. The maximum detectable level is a saturation charge amount of the horizontal shift register (for example, 300 ke$^-$), and the minimum detectable level is a noise level. In the present embodiment, the second partial spectrum data is divided by the integrated value ratio (output signal intensity ratio), and thus, the minimum detectable level (noise level) in the second partial spectrum data becomes smaller, and the dynamic range becomes larger.

As described above, in the present embodiment, the spectrum of light having a high dynamic range can be acquired using one photodetector 20. In addition, both of the light of high intensity and the light of low intensity can be measured substantially at the same time. Therefore, in a step of dry etching of an object by plasma processing, a spectrum of measurement target light including both of the light of high intensity due to a gas and the light of low intensity due to a material can be acquired, the state of the gas can be monitored, and the etching end timing can be detected. Further, in measuring a photoluminescence quantum yield of a sample using an integrating sphere, a spectrum of excitation light absorbed by the sample and a spectrum of light generated from the sample (for example, fluorescence) can be measured at the same time in a state in which the sample is put in the integrating sphere.

Further, the spectroscopic measurement apparatus and the spectroscopic measurement method of the present embodiment can measure both of the light of high intensity and the light of low intensity substantially at the same time, and further, can measure the light of high intensity and the light of low intensity at the different periods. In the latter case, the same measurement conditions can be set for the measurement of the light of high intensity and the measurement of the light of low intensity, and for example, an ND filter does not necessarily have to be inserted in the measurement of the light of high intensity. Examples of applications include a measurement of a spectrum of weak output light when a small current is applied to a light emitting diode (LED) and a measurement of a spectrum of bright output light when a rated current is applied to the LED. In such applications, the measurement of a high dynamic range of light can be performed with high wavelength accuracy.

The spectroscopic measurement apparatus and the spectroscopic measurement method are not limited to the above embodiments and configuration examples, and various other modifications are possible.

The spectroscopic measurement apparatus of the above embodiment is configured to include (1) an optical system for dispersing measurement target light to form a spectral image, (2) a photodetector including a light receiving surface on which a plurality of pixels are arranged respectively on a plurality of rows with the spectral image having a wavelength axis in a pixel arrangement direction of each of the plurality of rows being formed on the light receiving surface, and for receiving the spectral image for a first exposure time by a plurality of pixels arranged on one or a plurality of rows in a first region on the light receiving surface to output first spectrum data of the measurement target light, and receiving the spectral image for a second exposure time by a plurality of pixels arranged on one or a plurality of rows in a second region on the light receiving surface to output second spectrum data of the measurement target light, and (3) an analysis unit for obtaining a spectrum of the measurement target light based on the first spectrum data and the second spectrum data, and (4) the second exposure time is longer than the first exposure time, and when a wavelength band of the spectrum is divided into a saturation wavelength band including a wavelength band in which a value is at a saturation level or more in the second spectrum data and a non-saturation wavelength band other than the saturation wavelength band, the analysis unit obtains the spectrum of the measurement target light based on first partial spectrum data of the saturation wavelength band in the first spectrum data and second partial spectrum data of the non-saturation wavelength band in the second spectrum data.

The spectroscopic measurement method of the above embodiment is configured to include (1) a light detection step of using a photodetector including a light receiving surface on which a plurality of pixels are arranged respectively on a plurality of rows, forming a spectral image of measurement target light having a wavelength axis in a pixel arrangement direction of each of the plurality of rows on the light receiving surface, receiving the spectral image for a first exposure time by a plurality of pixels arranged on one or a plurality of rows in a first region on the light receiving surface to output first spectrum data of the measurement target light, and receiving the spectral image for a second exposure time by a plurality of pixels arranged on one or a plurality of rows in a second region on the light receiving surface to output second spectrum data of the measurement target light, and (2) an analysis step of obtaining a spectrum of the measurement target light based on the first spectrum data and the second spectrum data, and (3) in the light detection step, the second exposure time is longer than the first exposure time, and in the analysis step, when a wavelength band of the spectrum is divided into a saturation wavelength band including a wavelength band in which a value is at a saturation level or more in the second spectrum data and a non-saturation wavelength band other than the saturation wavelength band, the spectrum of the measurement target light is obtained based on first partial spectrum data of the saturation wavelength band in the first spectrum data and second partial spectrum data of the non-saturation wavelength band in the second spectrum data.

In the above spectroscopic measurement apparatus, the photodetector may be a CCD image sensor. Further, in the above spectroscopic measurement method, in the light detection step, a CCD image sensor may be used as the photodetector.

In the above spectroscopic measurement apparatus, the photodetector may set at least one of the first exposure time and the second exposure time by an anti-blooming gate. Further, in the above spectroscopic measurement method, in the light detection step, at least one of the first exposure time and the second exposure time may be set by an anti-blooming gate.

In the above spectroscopic measurement apparatus, the photodetector may synchronize an output operation of the first spectrum data with an output operation of the second spectrum data. Further, in the above spectroscopic measurement method, in the light detection step, an output operation of the first spectrum data may be synchronized with an output operation of the second spectrum data.

In the above spectroscopic measurement apparatus, in the photodetector, an output period of the second spectrum data is an integral multiple of an output period of the first spectrum data. Further, in the above spectroscopic measurement method, in the light detection step, an output period of the second spectrum data may be an integral multiple of an output period of the first spectrum data.

In the above spectroscopic measurement apparatus, the analysis unit may adjust both or one of the first partial spectrum data and the second partial spectrum data using a ratio of integrated values of the first spectrum data and the second spectrum data in a wavelength band in which both of the first spectrum data and the second spectrum data are at the saturation level or less, and may obtain the spectrum of the measurement target light based on the first partial spectrum data and the second partial spectrum data after the adjustment.

In the above spectroscopic measurement method, in the analysis step, both or one of the first partial spectrum data and the second partial spectrum data may be adjusted using a ratio of integrated values of the first spectrum data and the second spectrum data in a wavelength band in which both of the first spectrum data and the second spectrum data are at the saturation level or less, and the spectrum of the measurement target light may be obtained based on the first partial spectrum data and the second partial spectrum data after the adjustment.

INDUSTRIAL APPLICABILITY

The embodiments can be used as a spectroscopic measurement apparatus and a spectroscopic measurement method that can acquire a spectrum of light with a high dynamic range using one photodetector.

REFERENCE SIGNS LIST

1—spectroscopic measurement apparatus, 10—optical system, 20—photodetector, 21—first region, 22—second region, 30—analysis unit, 40—display unit, 50—input unit.

The invention claimed is:

1. A spectroscopic measurement apparatus for acquiring spectrum data of a spectral image of measurement target light in which a wavelength axis extends in a first direction and an image for each wavelength extends in a second direction, the apparatus comprising:
an optical system configured to disperse the measurement target light to form the spectral image;
a CCD image sensor including a light receiving surface including a first region having a plurality of pixels arranged along both the first direction and the second direction and a second region adjacent to the first region in the second direction and having a plurality of pixels arranged along both the first direction and the second direction, a first horizontal shift register to which charges generated in the first region are vertically transferred and configured to output as a first voltage value, and a second horizontal shift register to which charges generated in the second region are vertically transferred and configured to output as a second voltage value; and
an analyzer configured to combine first partial spectrum data based on the first voltage value and second partial spectrum data based on the second voltage value to acquire the spectrum data of the measurement target light, wherein
a second exposure time in the second region is longer than a first exposure time in the first region, and at least the first exposure time is set by an electronic shutter, and wherein
the optical system is configured to form the spectral image on the light receiving surface such that the spectral image on the light receiving surface has a symmetrical shape with a center line as a symmetry axis, and
the light receiving surface is divided into the first region and the second region with the symmetry axis of the spectral image to be formed as a boundary.

2. The spectroscopic measurement apparatus according to claim 1, wherein the first partial spectrum data is spectrum data of the measurement target light in a saturation wavelength band, and the second partial spectrum data is spectrum data of the measurement target light in a non-saturation wavelength band.

3. The spectroscopic measurement apparatus according to claim 1, wherein the electronic shutter is achieved by using an anti-blooming gate, and in the first region, the anti-blooming gate periodically repeats on/off.

4. The spectroscopic measurement apparatus according to claim 1, wherein, in the first region, unread charges in a vertical transfer are discarded before a next vertical transfer.

5. The spectroscopic measurement apparatus according to claim 1, wherein an output operation in the first region and an output operation in the second region are synchronized.

6. The spectroscopic measurement apparatus according to claim 1, wherein the charges generated in the plurality of pixels of the first region are added for each column in the second direction by the first horizontal shift register, and the charges generated in the plurality of pixels of the second region are added for each column in the second direction by the second horizontal shift register.

7. The spectroscopic measurement apparatus according to claim 1, wherein the CCD image sensor is configured to discard charges exceeding a predetermined amount in a pixel using the electronic shutter so that charge accumulation is not saturated in the pixel.

8. The spectroscopic measurement apparatus according to claim 1, wherein the CCD image sensor is a full-frame transfer type CCD image sensor.

9. A spectroscopic measurement method for acquiring spectrum data of a spectral image of measurement target light, the method comprising:
forming the spectral image of the measurement target light in which a wavelength axis extends in a first direction and an image for each wavelength extends in a second direction;
outputting a first voltage value and a second voltage value by using a CCD image sensor including a light receiving surface including a first region having a plurality of pixels arranged along both the first direction and the second direction and a second region adjacent to the first region in the second direction and having a plurality of pixels arranged along both the first direction and the second direction, a first horizontal shift register to which charges generated in the first region are vertically transferred and configured to output as the first voltage value, and a second horizontal shift register to which charges generated in the second region are vertically transferred and configured to output as the second voltage value; and
combining first partial spectrum data based on the first voltage value and second partial spectrum data based on the second voltage value to acquire the spectrum data of the measurement target light, wherein
a second exposure time in the second region is longer than a first exposure time in the first region, and at least the first exposure time is set by an electronic shutter, and wherein
the spectral image is formed on the light receiving surface such that the spectral image on the light receiving surface has a symmetrical shape with a center line as a symmetry axis, and
the light receiving surface is divided into the first region and the second region with the symmetry axis of the spectral image to be formed as a boundary.

10. The spectroscopic measurement method according to claim 9, wherein the first partial spectrum data is spectrum data of the measurement target light in a saturation wavelength band, and the second partial spectrum data is spectrum data of the measurement target light in a non-saturation wavelength band.

11. The spectroscopic measurement method according to claim 9, wherein the electronic shutter is achieved by using an anti-blooming gate, and in the first region, the anti-blooming gate periodically repeats on/off.

12. The spectroscopic measurement method according to claim 9, wherein, in the first region, unread charges in a vertical transfer are discarded before a next vertical transfer.

13. The spectroscopic measurement method according to claim 9, wherein an output operation in the first region and an output operation in the second region are synchronized.

14. The spectroscopic measurement method according to claim 9, wherein the charges generated in the plurality of pixels of the first region are added for each column in the second direction by the first horizontal shift register, and the charges generated in the plurality of pixels of the second region are added for each column in the second direction by the second horizontal shift register.

* * * * *